US012750153B2

(12) United States Patent
Mayer et al.

(10) Patent No.: US 12,750,153 B2
(45) Date of Patent: Sep. 29, 2026

(54) # MEASURING A RESISTANCE AGAINST AN ADVERSARIAL ATTACK AND ESTIMATING A PARAMETER OF AN INTERFERENCE SOURCE

(71) Applicant: Rohde & Schwarz GmbH & Co. KG, Munich (DE)

(72) Inventors: Timo Mayer, Munich (DE); Mikhail Volianskii, Mering (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 487 days.

(21) Appl. No.: 18/205,750

(22) Filed: Jun. 5, 2023

(65) Prior Publication Data

US 2024/0405911 A1 Dec. 5, 2024

(51) Int. Cl.
*H04K 3/00* (2006.01)

(52) U.S. Cl.
CPC ...................................... *H04K 3/22* (2013.01)

(58) Field of Classification Search
CPC ............ H04K 3/22; H04K 3/222; H04K 3/00; H04K 3/25; H04K 3/28
See application file for complete search history.

(56) References Cited

U.S. PATENT DOCUMENTS

2022/0357459 A1* 11/2022 Seibert ..................... H04K 3/22
2024/0202405 A1* 6/2024 Lang ....................... G06F 30/27

FOREIGN PATENT DOCUMENTS

CN 103618583 A * 3/2014
CN 112083654 A * 12/2020 ........... G05D 1/0875
CN 114114168 A * 3/2022
WO 2010/006754 A1 1/2010

OTHER PUBLICATIONS (CN 203164340 U), Ruan et al., A Broadband Radiation Immunity Automatic Testing Device, Aug. 2013, pp. 1-4 (Year: 2013).*

* cited by examiner

*Primary Examiner* — Keith Ferguson
(74) *Attorney, Agent, or Firm* — DITTHAVONG, STEINER & MLOTKOWSKI

(57) ABSTRACT

A measurement device for measuring a resistance of a communication system against an adversarial attack is provided. The measurement device is configured to carry out an adversarial attack on a device under test comprised by the communication system. The measurement device is further configured to measure the resistance of the device under test against the adversarial attack and to carry out the adversarial attack using a radio frequency, RF, signal and generate interference signals by means of a neural network. Also, a device for detection and parameter estimation of an interference source is provided, configured to detect an adversarial attack on a device in a communication system.

12 Claims, 4 Drawing Sheets

MEASURING A RESISTANCE AGAINST AN ADVERSARIAL ATTACK AND ESTIMATING A PARAMETER OF AN INTERFERENCE SOURCE

FIELD OF THE INVENTION

The present disclosure relates to communication systems, in particular 6G or beyond mobile communication systems. The present disclosure provides a measurement device for measuring a resistance of such a communication system against an adversarial attack, and a device for detection and parameter estimation of an interference source. The present disclosure also relates to manipulating the reception results in a communication system and an interference-resistant communication system.

TECHNICAL BACKGROUND

In communication systems, such as a 6G or beyond mobile communication system, many intelligent mechanisms can be used before a transmission is started. These mechanisms can scan or search an environment for radio frequency signals. Training may take place based on the scan or search results. For example, an AI-supported transmission can take place in a 6G or beyond mobile communication system, where training takes place before the start of a transmission.

However, there may be users who do not want the RF signals of their devices to be scanned or searched automatically.

SUMMARY OF THE INVENTION

Against this background, the object of the present invention is to provide a solution for measuring the resistance of a communication system against adversarial attacks and to estimate parameters of an interference source. The adversarial attack or the interference source can e.g. be used to prevent automatic scanning or searching of RF signals.

The invention is set out in the appended set of claims. The object is solved by the features of the independent claims. The dependent claims contain further developments.

A first aspect of the present disclosure provides a measurement device for measuring a resistance of a communication system against an adversarial attack, wherein the measurement device is configured to carry out an adversarial attack on a device under test, DUT, comprised by the communication system; and measure the resistance of the DUT against the adversarial attack, wherein the measurement device is further configured to carry out the adversarial attack using a radio frequency, RF, signal and generate interference signals by means of a neural network.

An adversarial attack in particular is an attack in the context of artificial intelligence (AI) or deep learning.

An adversarial attack in particular is an attack that comprises using of adversarial examples to manipulate classification results.

An adversarial example in particular is a specially manipulated input signal into an artificial neural network. An adversarial example in particular intentionally misleads a neural network into misclassification. The manipulation can be carried out in such a way that a human observer or a device does not notice it or does not recognize it as such. For example, a neural network trained to recognize RF signals could change the RF signals slightly so that a human, respectively a scanning or searching device for 6G or beyond, cannot see the changes, but the network misidentifies the RF signals.

In particular, the DUT can be at least one of: a user terminal, a user equipment, a base station, a wireless communication device.

In particular, the communication system can be a wireless communication system, e.g. a 6G or beyond wireless communication system In particular, resistance comprises the amount of adversarial examples which need to be observed, until a neural network is led to misclassification.

In an implementation form of the first aspect, the measurement device is further configured to generate predefined interference signals and/or generate the interference signals in a fixed order.

This ensures that the adversarial attack can be carried out effectively.

In a further implementation form of the first aspect, the measurement device is further configured to manipulate the interference signals prior to being output to the DUT.

This ensures that the adversarial attack can be carried out effectively and can be tailored to the DUT.

A second aspect of the present disclosure provides a method for measuring a resistance of a communication system against an adversarial attack, wherein the method comprises the steps of carrying out, by a measurement device, an adversarial attack on a device under test, DUT, comprised by the communication system; and measuring, by the measurement device, the resistance of the DUT against the adversarial attack, wherein the method further comprises the step of carrying out, by the measurement device, the adversarial attack using a radio frequency, RF, signal and generating, by the measurement device, interference signals by means of a neural network.

In an implementation form of the second aspect, the method further comprises generating predefined interference signals and/or generating the interference signals in a fixed order.

In a further implementation form of the second aspect, the method further comprises manipulating the interference signals prior to being output to the DUT.

The second aspect and its implementation forms include the same advantages as the first aspect and its respective implementation forms.

A third aspect of the present disclosure provides a device for detection and parameter estimation of an interference source, wherein the device is configured to detect an adversarial attack on a device in a communication system.

In particular, the interference source is the measurement device according to the first aspect or any of its implementation forms. In particular, the device in the communication system is the DUT according to the first aspect or any of its implementation forms.

In an implementation form of the third aspect, the device is further configured to detect the adversarial attack using a neural network.

In particular, the neural network is trained by supervised learning. In particular, the training is performed by training data of adversarial examples, i.e., marked signals in a frequency/time representation. Thus, a frequency/time resource of a signal is processed as an object.

In an implementation form of the third aspect, the device is further configured to report the detection of the adversarial attack.

In particular, the device reports the detection of the adversarial attack to a user of the device, or to another entity, e.g., the measurement device.

In an implementation form of the third aspect, the adversarial attack is carried out using a radio frequency, RF, signal.

In an implementation form of the third aspect, the device is further configured to estimate and use parameters of interference signals to determine a location of an interference source.

In an implementation form of the third aspect, the device is further configured to estimate the location of the interference source by using a neural network.

In particular, the neural network is trained by supervised learning. In particular, the training is performed by training data of locations of interference sources, i.e., marked signals in a frequency/time representation. Thus, a frequency/time resource of a signal is processed as an object.

In an implementation form of the third aspect, the device is further configured to estimate and use parameters of the RF signal and/or the interference signals to estimate motion parameters of the interference source.

In an implementation form of the third aspect, the device is further configured to use a neural network to estimate the motion parameters of the interference source.

In particular, the neural network is trained by supervised learning. In particular, the training is performed by training data of motion parameters of interference sources, i.e., marked signals in a frequency/time representation. Thus, a frequency/time resource of a signal is processed as an object.

In an implementation form of the third aspect, the device is further configured to estimate and use parameters of the signal the RF and/or interference signals for classification of the interference source, and/or to do the classification of the interference source by using a neural network.

In particular, the neural network is trained by supervised learning. In particular, the training is performed by training data of parameters of the RF signal and/or the interference signals and/or the interference source, i.e., marked signals in a frequency/time representation. Thus, a frequency/time resource of a signal is processed as an object.

A fourth aspect of the present disclosure provides a method for detection and parameter estimation of an interference source, wherein the method comprises the step of detecting an adversarial attack on a device in a communication system. This ensures that an adversarial attack performed by an interference source can be detected.

In an implementation form of the fourth aspect, the method further comprises detecting the adversarial attack using a neural network.

This ensures that the attack can be effectively detected.

In an implementation form of the fourth aspect, the method further comprises reporting the detection of the adversarial attack.

This ensures that the detected attack does not stay unnoticed.

In an implementation form of the fourth aspect, the adversarial attack is carried out using a radio frequency, RF, signal.

This provides effective ways of carrying out the attack.

In an implementation form of the fourth aspect, the method further comprises estimating and using parameters of interference signals to determine a location of an interference source.

This ensures that the location of the interference source can be precisely determined.

In an implementation form of the fourth aspect, the method further comprises estimating the location of the interference source by using a neural network.

This ensures that the determination is even more precise.

In an implementation form of the fourth aspect, the method further comprises estimating and using parameters of the RF signal and/or the interference signals to estimate motion parameters of the interference source.

This ensures that the motion parameters of the interference source can be precisely estimated.

In an implementation form of the fourth aspect, the method further comprises using a neural network to estimate the motion parameters of the interference source.

This ensures that the estimation is even more precise.

In an implementation form of the fourth aspect, the method further comprises estimating and using parameters of the RF signal and/or the interference signals for classification of the interference source, and/or to do the classification of the interference source by using a neural network.

This ensures that the estimation or the classification is even more precise.

The third aspect and its implementation forms include the same advantages as the fourth aspect and its respective implementation forms.

A fifth aspect of the present disclosure provides a computer program comprising instructions which, when the program is executed by a computer, cause the computer to carry out the method according to the second aspect or any of its implementation forms or the fourth aspect or any of its implementation forms.

A sixth aspect of the present disclosure provides a system for manipulating results of reception in a communication system based on the use of an auto-encoder, wherein the system generates an interfering RF signal which leads to an incorrect classification in the decoder of the auto-encoder.

In particular, the RF interference signal includes RF adversarial attacks.

In an implementation form of the sixth aspect, the generation of a interfering signal takes place using a neural network.

In a further implementation form of the sixth aspect, the interfering RF signal, which leads to an incorrect classification in a receiver of the communication system, is detected by the system.

In a further implementation form of the sixth aspect, the detection of the interfering signal is performed using a neural network.

In a further implementation form of the sixth aspect, the system reports detection of an interfering signal.

In a further implementation form of the sixth aspect, the detection of an interfering signal is used to reduce the probability of misclassification in the decoder.

In a further implementation form of the sixth aspect, a neural network is used to reduce the probability of incorrect classification in the decoder.

In a further implementation form of the sixth aspect, parameters of the interfering RF signal are estimated and used to estimate the location of the source of the interfering signal.

In a further implementation form of the sixth aspect, a neural network is used to estimate the location of the noise source.

In a further implementation form of the sixth aspect, parameters of the interfering RF signal are estimated and used to estimate motion parameters of the interfering signal source.

In a further implementation form of the sixth aspect, a neural network is used to estimate the motion parameters of the noise source.

In a further implementation form of the sixth aspect, parameters of the interfering RF signal are estimated and used for classification of the source of the interfering signal.

In a further implementation form of the sixth aspect, the classification of the interfering signal source takes place using a neural network.

A seventh aspect of the present disclosure provides an interference tolerant communication system, wherein interfering RF signals are used in training decoders of an auto-encoder.

An eighth aspect of the present disclosure provides a measuring device for measuring the resistance of a communication system based on the use of an auto-encoder to an adversarial attack characterized by the generation of an interfering RF signal, the generated RF signal resulting in an incorrect classification in the decoder of the auto-encoder.

In an implementation form of the eighth aspect, the generation of the interfering signal takes place using a neural network.

In a further implementation form of the eighth aspect, a set of interfering signals is predefined and generated selectively or in a fixed order.

In a further implementation form of the eighth aspect, the predefined interfering signals are manipulated prior to generation.

A ninth aspect of the present disclosure provides a system for the detection and parameter estimation of an interference source, whereby an interfering RF signal, which leads to an incorrect classification in the decoder of a communication system based on the use of auto-encoder, is detected.

In an implementation form of the ninth aspect, the detection of the interfering signal is performed using a neural network.

In a further implementation form of the ninth aspect, the system reports detection of an interfering signal.

In a further implementation form of the ninth aspect, parameters of the interfering RF signal are estimated and used to estimate the location of the source of the interfering signal.

In a further implementation form of the ninth aspect, a neural network is used to estimate the location of the noise source.

In a further implementation form of the ninth aspect, parameters of the interfering RF signal are estimated and used to estimate motion parameters of the interfering signal source.

In a further implementation form of the ninth aspect, a neural network is used to estimate the motion parameters of the noise source.

In a further implementation form of the ninth aspect, parameters of the interfering RF signal are estimated and used for classification of the source of the interfering signal.

In a further implementation form of the ninth aspect, the classification of the source of the interfering signal is performed using a neural network.

A tenth aspect of the present disclosure provides a system for manipulating reception results in a communication system, an adversarial attack being used to manipulate the reception result.

In an implementation form of the tenth aspect, the system is based on End2End-Learning, wherein the system is based on an auto-encoder, wherein an RF interference signal is used in the adversarial attack, wherein the generation of the interfering signal takes place with the help of a neural network An eleventh aspect of the present disclosure provides an interference-resistant communication system, wherein an adversarial attack is detected, which leads to an incorrect classification in the receiver of the communication system, is detected by the system, wherein the system is based on end-to-end learning.

In an implementation form of the eleventh aspect, the Adversarial Attack is carried out using an interfering RF signal.

In a further implementation form of the eleventh aspect, the detection of the adversarial attack is performed with the help of a neural network.

In a further implementation form of the eleventh aspect, the system reports detection of an interfering signal.

In a further implementation form of the eleventh aspect, the detection of an interfering signal is used for reducing the probability of wrong classification in the decoder.

In a further implementation form of the eleventh aspect, parameters of the interfering RF signal are estimated and used to estimate the location of the source of the adversarial attack.

In a further implementation form of the eleventh aspect, a neural network is used to estimate the location of the noise source.

In a further implementation form of the eleventh aspect, parameters of the interfering RF signal are estimated and used for classification of the interfering signal source.

In a further implementation form of the eleventh aspect, the classification of the interference signal source takes place with the help of a neural network.

A twelfth aspect of the present disclosure provides an interference-resistant communication system, whereby the adversarial attack is taken into account when training the communication system based on End2End-Learning.

In an implementation form of the twelfth aspect, the adversarial attack occurs through an RF signal.

An exemplary embodiment of the invention is now further explained with respect to the drawings by way of examples only, in which FIG. 1 shows a schematic view of a device according to an embodiment of the present invention;

DETAILED DESCRIPTION

Figure 1:
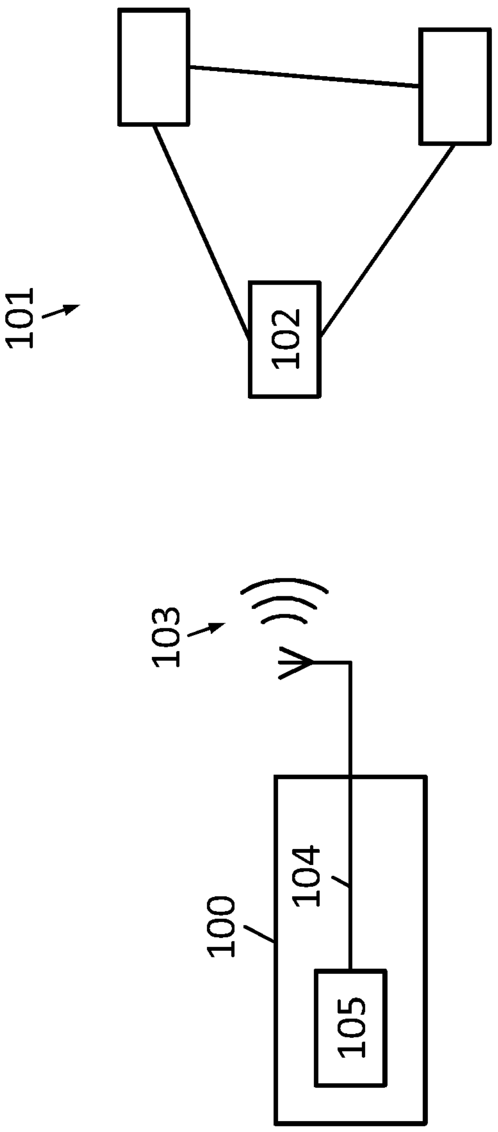

FIG. 1 shows a schematic illustration of a measurement device 100. The device 100 is designed for measuring a resistance of a communication system 101 against an adversarial attack.

To this end, the measurement device 100 is configured to carry out an adversarial attack on a device under test, DUT, 102 comprised by the communication system 101.

To measure the resistance of the DUT 102 against the adversarial attack, the measurement device 100 is further configured to carry out the adversarial attack using a radio frequency, RE, signal 103. Interference signals 104, which are comprised by the RF signal 103 are generated by means of a neural network 105. The neural network 105 is e.g., pre-stored in the measurement device 100.

Optionally, the measurement device 100 can be configured to generate predefined interference signals 104. Optionally, the measurement device can be configured to generate the interference signals 104 in a fixed order. Thereby, the adversarial attack, during which an adversarial example is sent to the DUT 102, can be carried out.

Further optionally the measurement device 100 can be configured to manipulate the interference signals 104 prior to being output to the DUT 102. Thereby, the adversarial attack and/or the adversarial example can be adjusted, depending on the DUT which is to be attacked.

Figure 2:
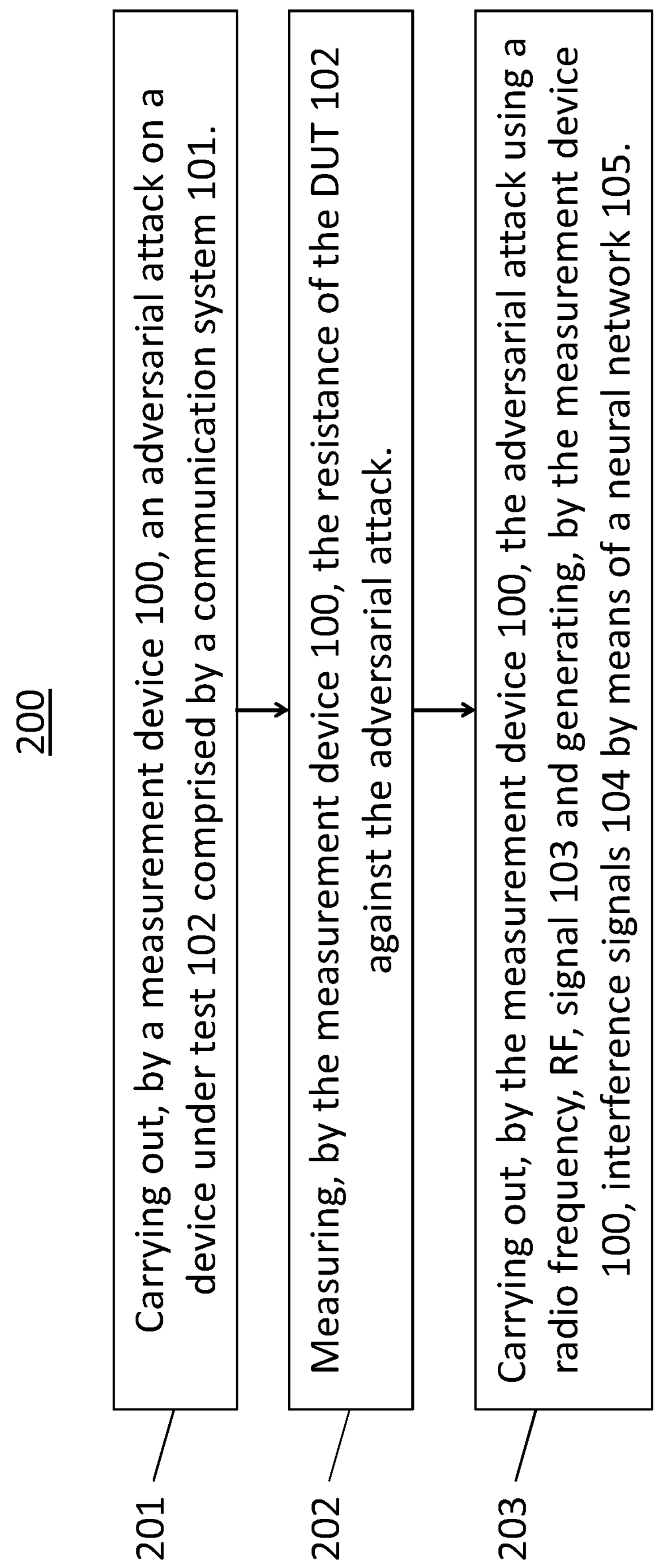
FIG. 2 shows a schematic view of a method according to an embodiment of the present invention.

FIG. 2 shows a method 200 for measuring a resistance of a communication system 101 against an adversarial attack, wherein the method 200 comprises a first step of carrying out 201, by a measurement device 100, an adversarial attack on a device under test, DUT, 102 comprised by the communication system 101. The method comprises a second step of measuring 202, by the measurement device 100, the resistance of the DUT 102 against the adversarial attack. The method 200 further comprises a step of carrying out 203, by the measurement device 100, the adversarial attack using a radio frequency, RF, signal 103 and generating, by the measurement device 100, interference signals 104 by means of a neural network 105.

Figure 3:
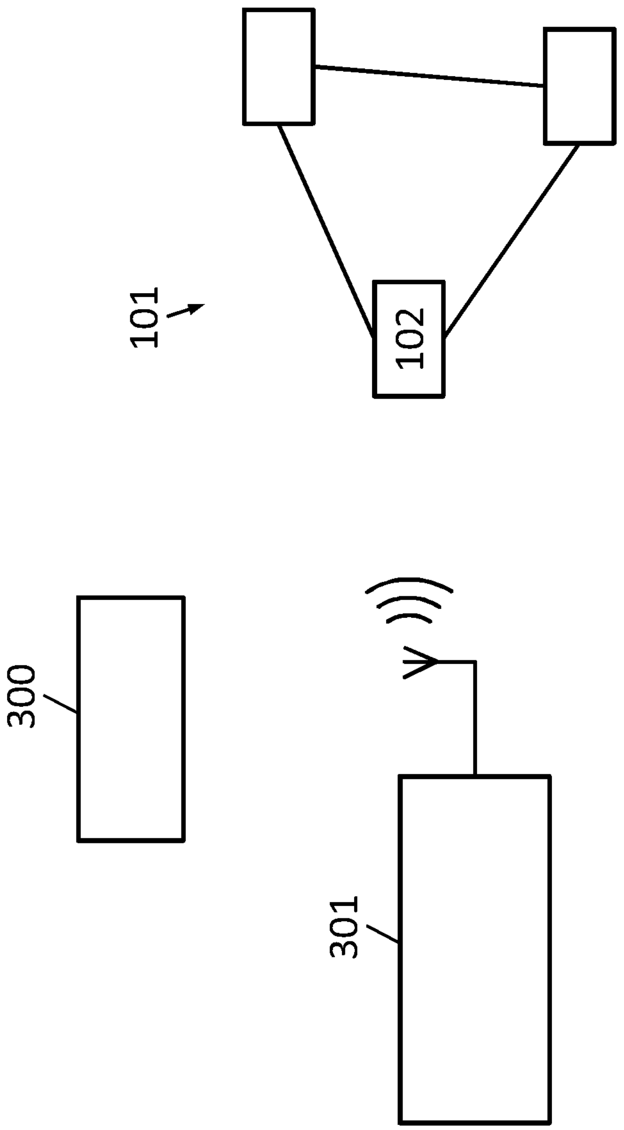
FIG. 3 shows a schematic view of a device according to an embodiment of the present invention.

FIG. 3 shows a schematic view of a device 300 for detection and parameter estimation of an interference source 301. The interference source 301 can e.g., be the measurement device 100 which performs the adversarial attack.

Thus, the device 300 is configured to detect an adversarial attack on a device 102 in a communication system 101.

Optionally, the device 300 can detect the adversarial attack using a neural network. Further optionally, the device 300 can report the detection of the adversarial attack, e.g., to a user of the device 300 or to another entity.

The device 300 in particular can detect an adversarial attack that is carried out using a radio frequency, RF, signal 103.

Further optionally, the device 300 can estimate and use parameters of interference signals 104 (that is, interference signals 104 in the RF signal 103 as part of an adversarial attack) to determine a location of an interference source 301 (that is, the source of an adversarial attack). The device 300 in particular can estimate the location of the interference source 301 by using on a neural network.

Further optionally, the device 300 can estimate and use parameters of the RF signal 103 and/or the interference signals 104 to estimate motion parameters of the interference source 100. The device 300 can in particular use a neural network to estimate the motion parameters of the interference source 100.

Further optionally, the device 300 can estimate and use parameters of the RF signal 103 and/or the interference signals 104 for classification of the interference source 100. The device 300 can in particular use a neural network to do the classification of the interference source 100.

Figure 4:
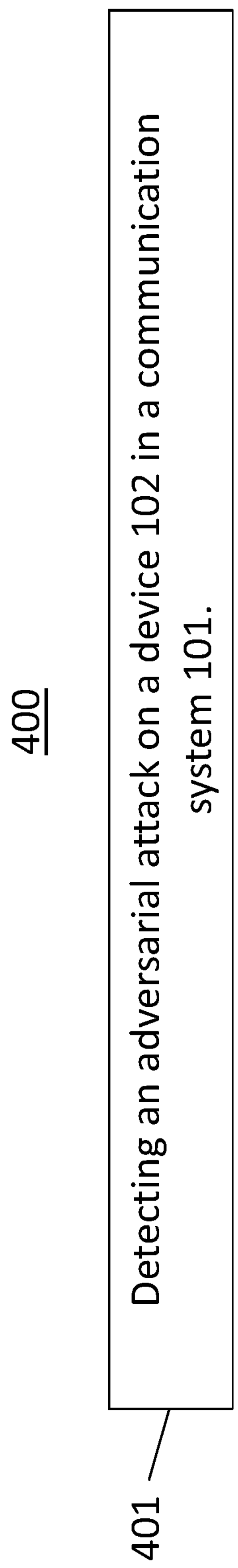
FIG. 4 shows a schematic view of a method according to an embodiment of the present invention.

FIG. 4 shows a method 400 for detection and parameter estimation of an interference source 301. The method 400 comprises the step of detecting 401 an adversarial attack on a device 102 in a communication system 101.

It is important to note that the inventive device and method very closely correspond. Therefore, all the above said regarding the device is also applicable to the method. Everything which is described in the description and/or claimed in the claims and/or drawn in the drawings can be combined.

The invention is not limited to the illustrated embodiment. The network devices may be mobile terminals such as mobile phones, but also computers such as personal computers or the like. All features described above, or features shown in the figures can be combined with each other in any advantageous manner within the scope of the invention.

The invention claimed is:

1. A measurement device for measuring a resistance of a communication system against an adversarial attack, wherein the measurement device is configured to:

carry out an adversarial attack on a device under test, DUT, comprised by the communication system; and measure the resistance of the DUT against the adversarial attack, wherein the measurement device is further configured to carry out the adversarial attack using a radio frequency, RF, signal and generate interference signals by means of a neural network, wherein the adversarial attack comprises using of at least one manipulated input signal into the neural network to manipulate interference classification results of the neural network, wherein the measurement device is further configured to predefine the interference signals and/or generate the interference signals in a fixed order, and wherein the measurement device is further configured to manipulate the interference signals prior to being output to the DUT.

2. A method for measuring a resistance of a communication system against an adversarial attack, wherein the method comprises the steps of:

carrying out, by a measurement device, an adversarial attack on a device under test, DUT, comprised by the communication system; and measuring, by the measurement device, the resistance of the DUT against the adversarial attack, wherein the method further comprises the step of carrying out, by the measurement device, the adversarial attack using a radio frequency, RF, signal and generating, by the measurement device, interference signals by means of a neural network, wherein the adversarial attack comprises using of at least one manipulated input signal into the neural network to manipulate interference classification results of the neural network, wherein the method further comprises the step of predefining the interference signals and/or generating the interference signals in a fixed order, and wherein the method further comprises the step of manipulating the interference signals prior to being output to the DUT.

3. A device for detection and parameter estimation of an interference source, wherein the device is configured to detect an adversarial attack on a device in a communication system, wherein the device is further configured to estimate and use parameters of interference signals to determine a location of an interference source, wherein the adversarial attack comprises using of at least one manipulated input signal into a neural network to manipulate interference classification results of the neural network, wherein the interference signals are predefined and/or generated the in a fixed order, and wherein the interference signals are manipulated prior to being output to the device in the communication system.

4. The device according to claim 3, further configured to detect the adversarial attack using the neural network.

5. The device according to claim 3, further configured to report the detection of the adversarial attack.

6. The device according to any one of claim 3, wherein the adversarial attack is carried out using a radio frequency, RF, signal.

7. The device according to any one of claim 3, further configured to estimate the location of the interference source by using on the neural network.

8. The device according to any one of claim 3, further configured to estimate and use parameters of the RF signal and/or the interference signals to estimate motion parameters of the interference source.

9. The device according to any one of claim 3, further configured to use the neural network to estimate the motion parameters of the interference source.

10. The device according to any one of claim 3, further configured to estimate and use parameters of the RF signal and/or the interference signals for classification of the interference source, and/or to do the classification of the interference source by using the neural network.

11. A method for detection and parameter estimation of an interference source, wherein the method comprises the step of detecting an adversarial attack on a device in a communication system, wherein the method further comprises the step of estimating and using parameters of interference signals to determine a location of an interference source, wherein the adversarial attack comprises using of at least one manipulated input signal into a neural network to manipulate interference classification results of the neural network, wherein the interference signals are predefined and/or generated the in a fixed order, and wherein the interference signals are manipulated prior to being output to the device in the communication system.

12. A non-transitory computer-readable medium comprising instructions which, when the program is executed by a computer, cause the computer to carry out the steps of:

carrying out, by a measurement device, an adversarial attack on a device under test, DUT, comprised by the communication system; and measuring, by the measurement device, the resistance of the DUT against the adversarial attack, wherein the method further comprises the step of carrying out, by the measurement device, the adversarial attack using a radio frequency, RF, signal and generating, by the measurement device, interference signals by means of a neural network, wherein the adversarial attack comprises using of at least one manipulated input signal into a neural network to manipulate interference classification results of the neural network, wherein the method further comprises the step of predefining the interference signals and/or generating the interference signals in a fixed order, and wherein the method further comprises the step of manipulating the interference signals prior to being output to the DUT.

* * * * *